United States Patent [19]
Nordell

[11] 3,910,313
[45] Oct. 7, 1975

[54] HYDRAULIC VALVE UNIT
[75] Inventor: Randy J. Nordell, Salt Lake City, Utah
[73] Assignee: Time Commerical Financing Corporation, Salt Lake City, Utah
[22] Filed: May 13, 1974
[21] Appl. No.: 469,462

Related U.S. Application Data
[62] Division of Ser. No. 367,713, June 7, 1973, Pat. No. 3,824,043.

[52] U.S. Cl. .................................. 137/625.23
[51] Int. Cl.² .................................. F16K 11/085
[58] Field of Search...... 137/625.23, 625.24, 625.46

[56] References Cited
UNITED STATES PATENTS

| | | | |
|---|---|---|---|
| 2,781,056 | 2/1957 | Carufel | 137/625.46 |
| 2,940,476 | 6/1960 | Schultz | 137/625.23 |
| 3,610,283 | 10/1971 | Hill et al. | 137/625.23 |

Primary Examiner—Henry T. Klinksiek
Attorney, Agent, or Firm—Mallinckrodt & Mallinckrodt

[57] ABSTRACT

A hydraulic valve unit for controlling fluid flow between a source of hydraulic fluid (which may supply pressurized fluid intermittently) and a hydraulically operated device, such as a hydraulic power cylinder for raising and lowering the cab of an automotive truck, includes a value body and a cylindrical valve spool with an axial bore adapted to a received hydraulic fluid from a fluid source. The valve spool is rotatably mounted and arranged to supply inflowing hydraulic fluid under pressure to one port of a hydraulically powered device and to receive return fluid from another port of such device when in one position and to reverse said supply and return of fluid in a rotated position. Check valve means are provided in the axial bore of the valve to prevent flow of fluid from the axial bore back to the source of hydraulic fluid.

2 Claims, 9 Drawing Figures

HYDRAULIC VALVE UNIT

RELATED APPLICATION

This application is a division of application Ser. No. 367,713 filed June 7, 1973, now U.S. Pat. No. 3,824,043.

BACKGROUND OF THE INVENTION

1. Field

The invention is in the field of pump and valve systems for causing and controlling forward and reverse flows of hydraulic fluid to and from a hydraulically powered device, such as a lift cylinder commonly employed in a truck-cab-raising and lowering system.

2. State of the Art

A number of different four-way valves have been developed heretofore, some specifically for use in hydraulic systems designed to raise and lower the cab of a tractor-trailer type of automotive truck, see for example U.S. Pat. Nos. 3,430,653 and 3,610,283, the latter disclosing an elongate valve spool having an axial bore and radial passages extending from such bore to selective communication with ports in a valve body in which the valve spool is installed. In all of these, however, the hydraulic fluid is supplied through one or another of the ports of the valve body and is directed in one way or another by means of the valve spool. Moreover, the pump is usually remotely located relative to the control valve. As a result, various problems are encountered.

SUMMARY OF THE INVENTION

In accordance with the invention, advantages are obtained in the minimizing of machining time on the valve body by reason of decreasing the usual number of ports and passages; in the minimizing of flow distances for the hydraulic fluid between pump and valve; in the provision for pressures to be contained by and within the valve itself, rather than to react on the pump during the intake stroke thereof; and in improved sealing characteristics.

The pump and valve are closely coupled portions of a unitary device and the feed from pump reservoir to the pump proper and from pump proper to valve is through the same flow passage, thereby minimizing flow distance. Pressurized hydraulic fluid from the pump portion of the unit is supplied directly to an axial bore in the valve spool of the valve portion of the unit. Back-flow is prevented by a check valve advantageously located in such bore, thereby providing for containment of pressure within the valve. Ports may be and preferably are spaced 120° apart. This makes for improved sealing characteristics.

A particularly advantageous feature in connection with use of the device in a truck-cab-raising and lowering system is the provision for cushioning of free fall of the truck cab substantially immediately upon the commencement of free fall. This is accomplished by the arrangement for direct and relatively free flow of hydraulic fluid from the pump portion of the unit to the valve portion thereof.

The flow passage through which the pump is supplied with hydraulic fluid from the pump reservoir on its intake stroke and through which the control valve is supplied with pressurized hydraulic fluid on the pressure stroke of the pump is provided with a check valve between pump and pump reservoir, permitting inflow from reservoir to pump on the latter's intake stroke and preventing back-flow into the reservoir on the pressure stroke. The other check valve aforementioned, being of reverse type, prevents the pulling of hydraulic fluid from the system on the intake stroke of the pump during supply thereto of fluid from the reservoir.

THE DRAWINGS

An embodiment representing the best mode presently contemplate of carrying out the novel concepts of the invention in actual practice is illustrated in the accompanying drawings, in which:

FIG. 1 represents a view in front elevation of a hydraulic pump and valve unit conforming to the invention;

FIG. 2, a top plan view of the same;

FIG. 3, a view in vertical section taken on the line 3—3 of FIG. 2, and showing various hidden parts in broken lines;

FIG. 4, a view in vertical section taken on the line 4—4 of FIG. 3;

FIG. 5, a detail view in transverse vertical section of the valve portion of the unit taken on the line 5—5 of FIG. 4, showing one position of the valve spool for the supply and return of hydraulic fluid to a hydraulically-operated device, such as a lift cylinder for raising and lowering the cab of an automotive truck;

FIG. 6, a similar view taken after the valve spool has been rotated to a reverse position;

FIG. 7, a fragmentary view in longitudinal vertical section taken on the line 7—7 of FIG. 5, showing the valve spool in elevation;

FIG. 8, a fragmentary view in longitudinal horizontal section taken on the line 8—8 of FIG. 6; and FIG. 9, a view in transverse vertical section taken on the line 9—9 of FIG. 8.

DETAILED DESCRIPTION OF THE ILLUSTRATED EMBODIMENT

Figure 1:
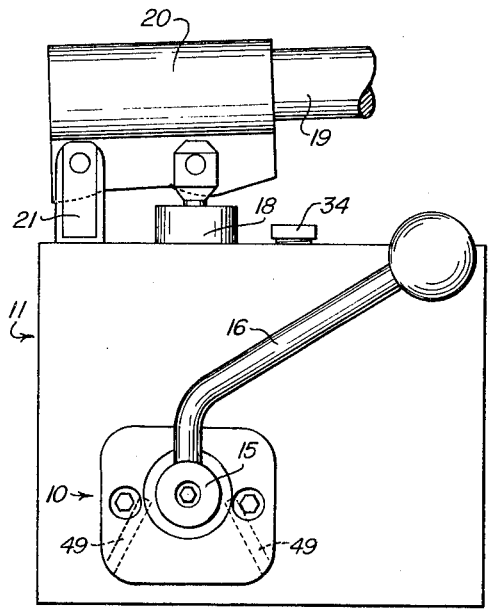
Figure 2:
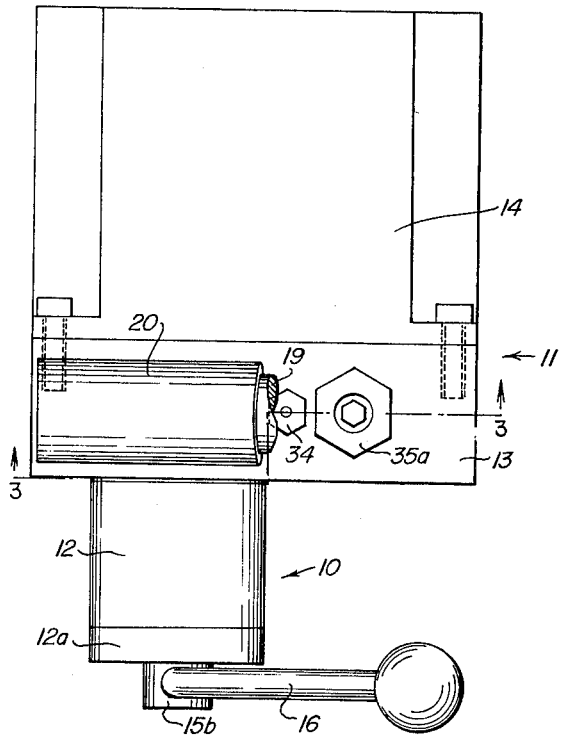

In the form illustrated, the unit comprises a valve portion 10, FIG. 1, closely coupled to a pump portion 11. A valve body 12, FIGS. 2 and 4, is connected to a pump housing 13, which is attached to a reservoir 14, FIG. 3, for holding a supply of hydraulic fluid. A cylindrical valve spool 15 is rotatably received by and extends through the valve body, and is rotated by means of a handle 16.

Provided within pump housing 13 is a pump cylinder 17 having a piston 18 adapted for manual reciprocation by means of a pump handle 19. The handle is secured at one end in a socket piece 20, which is pivotally attached to a mounting post 21, FIGS. 1 and 3, extending from and attached to the pump housing, and which is also pivotally attached to the upper end of piston 18. Thus, upon moving pump handle 19 up and down, piston 18 is moved up and down within cylinder 17.

Valve spool 15 is provided with an axial bore 15a extending thereinto from one end. Such bore communicates directly with a preferably rectilinear flow passage 22 below pump cylinder 17 and extending into reservoir 14 by way of a filtering device 23 of any usual construction. Pump cylinder 17 communicates with flow passage 22 through a port 24 in its otherwise closed bottom. It thus receives direct and substantially free flow of hydraulic fluid from reservoir 14 over a relatively short distance on the intake strokes of the pump and is able to deliver pressurized hydraulic fluid to the interior of valve spool 15 by direct, substantially free flow over a relatively short distance on the pressure strokes of the pump.

A check valve in flow passage 22 between reservoir 14 and pump cylinder port 24 is provided by a ball 25 normally held against seat 26a of an adaptor sleeve 26 by spring 27. A second, reverse-acting check valve, conveniently located in bore 15a of valve spool 15, is provided by a ball 28 normally held against seat 29 of a sleeve 29 by spring 30.

In operation, when pump handle 19 is raised, thereby raising piston 18 in cylinder 17, hydraulic fluid is drawn from reservoir 14 through flow passage 22 and past ball 25 through port 24 into the cylinder, ball 28 seating to prevent back flow of hydraulic fluid from the external system (not shown) through valve 10. When pump handle 19 is pushed down, thereby forcing piston 18 to descend in cylinder 17, the hydraulic fluid in the cylinder is forced out of port 24 under pressure. It, in turn, forces ball 25 against its seat 26, forces ball 28 to unseat against the nominal holding pressure of spring 30, and flows under pressure into and through valve 10 to activate the hydraulically powered device in the external system. If excessive pressure is built up within pump cylinder 17, some fluid is released directly to reservoir 14. For this purpose, intercommunicating passages 31 and 32 are provided in pump housing 13. Passage 31 opens into flow passage 22 and thereby communicates with pump cylinder 17 through port 24. Passage 32 communicates with reservoir 14 through a pressure relief valve 33. A pressure relief valve 34, FIGS. 1, 2 and 3, leading to atmosphere, is also provided in the top wall of reservoir 14.

Figure 3:
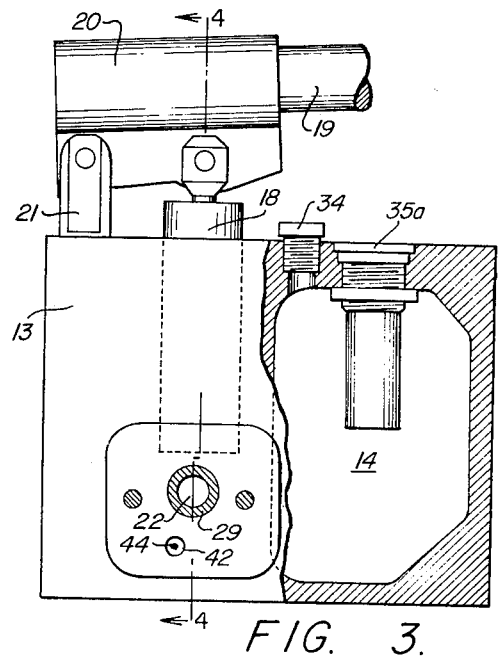
Figure 4:
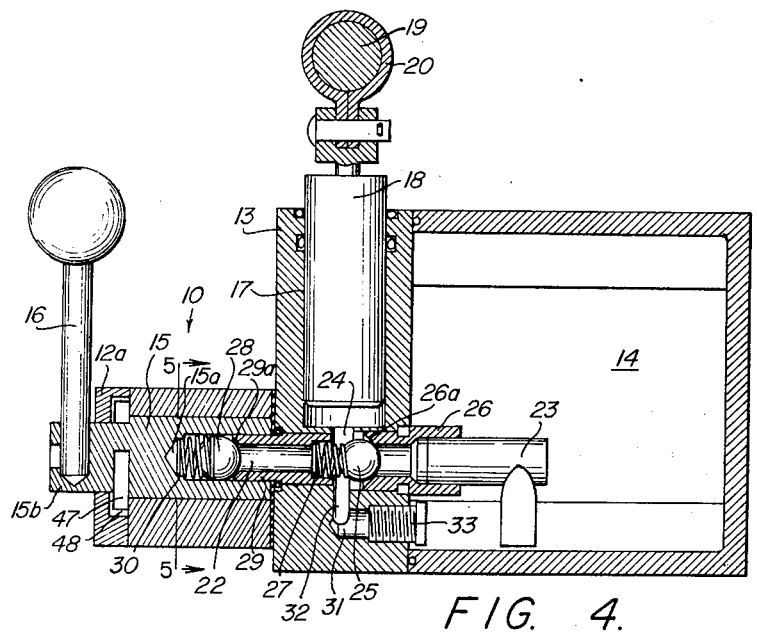

Hydraulic fluid is supplied to reservoir 14 through a fitting 35, FIG. 3, which is normally closed by a plug 35a.

Figure 5:
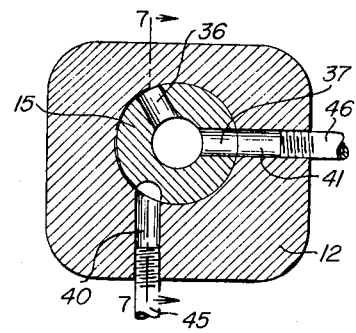
Figure 6:
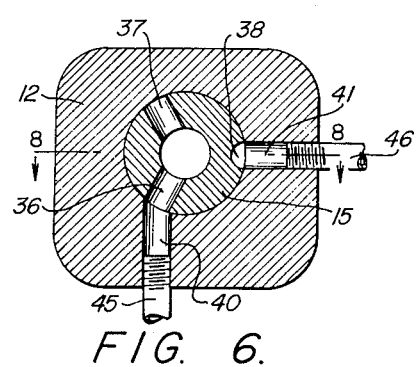

There are two divergent flow passages 36 and 37, FIGS. 5 and 6, extending radially from axial flow passage 15a within valve spool 15 to the surface of the spool. These passages are preferably positioned 120° apart along the circumference of the spool as indicated in FIG. 6, to provide most effectively for fluid sealing. A longitudinal groove 38 is provided on the surface of the spool 120° from each of the flow passages 36 and 37 and extending from circumferential alignment therewith to a circumferential groove 39, FIGS. 7, 8 and 9, provided around the surface of the spool at a location spaced axially along the spool.

A pair of passages 40 and 41, FIGS. 5 and 6, are provided in valve body 12 for selective registry with either the groove 38 and passage 37, respectively, of the valve spool, as in FIG. 5, or with the passage 36 and groove 38, respectively, as in FIG. 6. Thus, one of the passages of the valve body is in communication with one of the divergent passages of the valve spool and the other in communication with the longitudinal groove of such valve spool in each of the two working positions of the valve. This can be seen by comparing FIGS. 5 and 6.

Figure 7:
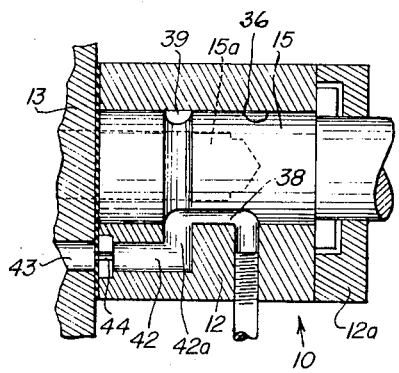
Figure 8:
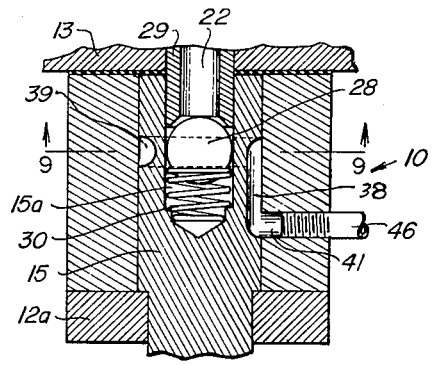
Figure 9:
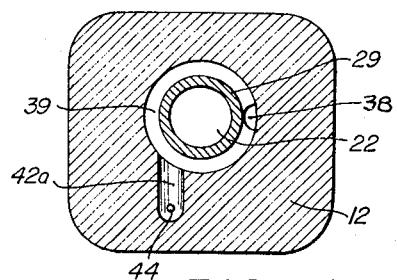

As shown in FIGS. 7 and 8, longitudinal groove 38 of the valve spool communicates with circumferential groove 39 thereof in both of the two working positions of such spool.

A third passage 42, FIG. 7, within valve body 12 has a radial portion 42a positioned to register with circumferential groove 39 of valve spool 15 and a longitudinal portion 42b that communicates with a fluid-return passage 43 in pump housing 13 through a restricted orifice 44 of adjustable type. Passage 43 (shown only fragmentarily) leads back to reservoir 14. Orifice 44 controls the rate of return fluid flow and may be adjusted to meet the needs of the system.

As previously indicated, the illustrated embodiment is particularly designed for use with tilt cabs in the truck industry. In such application, it is necessary to lift a truck cab until its center of gravity reaches a high point, from where it will free-fall for the remainder of its travel.

With the valve spool placed in the position shown in FIG. 6, movement of the pump handle up and down forces hydraulic fluid under pressure into and through axial flow passage 36 thereof, and into and through passage 40 of valve body 12 from where it flows through a line 45 into one end of the lift cylinder (not shown) of the overall system. This raises the cab of the truck in well known manner. The fluid in the opposite end of the lift cylinder flows back into valve 10 through a line 46 attached to passage 41, which is in communication with longitudinal groove 38. The return fluid flows into circumferential groove 39, into passage 42, through orifice 44, into passage 43, and thence into the reservoir 14. Pumping is continued until the center of gravity of the truck cab has reached a high point, at which time the cab will start free fall to its final open rest position. During free fall, pumping is no longer necessary. This is because the weight of the cab is now acting on the cylinder in the same direction as the pump had been. Fluid flow in the system continues in the same flow path as described above, except that the weight of the cab acting on the power cylinder is the driving force for fluid flow, rather than the pump. Fluid is forced out of the lift cylinder and follows the path described above. Orifice 44 regulates the rate of flow of fluid and thus controls the rate of free fall of the cab. Because of the direct and substantially free flow of fluid into and through flow passage 22a of the valve, check of free fall of the truck cab is immediate. If a still slower rate of free fall than that provided by orifice 44 is desired, valve spool 15 may be rotated slightly so that passage 41 of valve body 12 is in only partial communication with groove 38, thereby further restricting fluid flow from the lift cylinder. If the valve spool is rotated enough so that there is no communication between passage 41 and groove 38, the truck cab will remain stationary.

To operate the power cylinder in the opposite direction for returning the truck cab to its original closed condition, valve spool 12 is rotated clockwise 120° from its position in FIG. 6 to the position shown in FIG. 5. The pump is now connected through axial flow passage 22a and flow passage 37 of the valve spool and through passage 41 of the valve body to the opposite end of the lift cylinder of the overall system. Pressure fluid now forces the piston in the power cylinder in the opposite direction, and return fluid from the lift cylinder flows into and through passage 40 of the valve body into and through longitudinal groove 38, circumferential groove 39, passage 42, orifice 44, and passage 43 back to reservoir 14. Again pumping is continued until the center of gravity of the truck cab reaches its high point, at which time it continues its travel by free fall in a manner similar to that explained above.

While the 120° spacing of the divergent flow passages is presently preferred, because, during pumping operation, an equal force is exerted against the spool by each of the flow passages in turn, thereby producing a resultant force exerted in the direction of the longitudinal groove, and thus helping to form a tight seal between the groove and the valve body, it should be realized that any angle between the divergent passages could be utilized as long as the longitudinal groove is maintained an equal angular distance from each of the passages, such groove being located within either the larger or smaller angle between the passages.

The two working positions of valve 10 are reached easily by providing stops for handle 16 at appropriate locations determining the limits of its back and forth movements, which bring selective registry of certain ports in valve spool 15 with certain ports in valve body 12, all as shown in FIGS. 5 and 6, respectively. In the form illustrated, see FIGS. 1 and 4, terminal end portion 15b of valve spool 15 is of reduced diameter and passes through a hollow cap member 12a of valve body 12 before receiving control handle 16.

A pin 47 extends radially into chamber 48 of valve body cap member 12a, between a pair of limit stops, from securement in valve spool end portion 15b. The limit stops are provided by set screws 49, FIG. 1, accessible from the exterior of the valve body.

Instead of providing two divergent passages in the valve spool, one such passage extending from the axial flow passage to the surface of the spool could be provided, together with two longitudinal grooves (like 38) connecting to a circumferential groove (like 39), with the said one passage being located an equal angular distance from both of the lingitudinal grooves and within either the larger or smaller sector between such grooves.

While the circumferential groove 39 is illustrated as extending completely around the valve spool, and this is presently preferred because of manufacturing techniques, it should be realized that this groove need only extend a distance equal to the distance between one of the divergent flow passages and longitudinal groove 38.

Whereas this invention is specifically illustrated and described with respect to a presently preferred embodiment thereof, it should be understood that other embodiments can be constructed from the teachings hereof without departing from the inventive concepts defined by the claims.

I claim:

1. A valve for use in controlling fluid flow between a source of hydraulic fluid and a hydraulically operated device, comprising a valve body; a cylindrical valve spool rotatably mounted within said valve body and having an axial bore extending thereinto from one end thereof serving as an inlet for pressurized hydraulic fluid from a source of same; one or more flow passages extending transversely through said valve spool from flow communication with said axial bore to flow communication with the cylindrical surface of the valve spool; a pair of ports circumferentially spaced in said valve body, positioned to independently register with said flow passage of the valve spool and to be in independent flow communication with a hydraulically powered device; a partial or completely circumferential groove formed in the cylindrical surface of the valve spool in longitudinally spaced relationship with said flow passage of the valve spool; an exhaust port in said valve body positioned to register with said circumferential groove; a longitudinal groove in the cylindrical surface of said valve spool and connecting with said circumferential groove; means for rotating the valve spool from a position in which one of said flow pssages that is in communication with the axial bore is in registry with one of said pair of ports in the valve body and the longitudinal groove is in registry with the other of said pair of ports, to a position in which the registries are reversed; and check valve means located in said axial bore to allow pressurized hydraulic fluid from said source of same to flow into the bore, but to prevent flow of fluid from the bore back to said source.

2. A valve as defined by claim 1, wherein the flow passage means in the valve spool includes a second flow passage spaced circumferentially from the first, and the registry of one flow passage with one of the pair of ports is made with the said second flow passage in the reversal of registries.

* * * * *

UNITED STATES PATENT OFFICE
CERTIFICATE OF CORRECTION

PATENT NO. : 3,910,313
DATED : October 7, 1975
INVENTOR(S) : Randy J. Nordell

It is certified that error appears in the above-identified patent and that said Letters Patent are hereby corrected as shown below:

On line 6 of the Abstract, "value" should be "valve".

On line 7 of the Abstract, "a received" should be --- received ---.

In column 2 of the Specification, line 9, "contemplate" should be "contemplated".

In column 5, line 30, "lingitudinal" should be "longitudinal".

In column 6, line 26, "pssages" should be "passages".

In column 6, line 39, after "registry of", "the" should be inserted.

Signed and Sealed this fourth Day of May 1976

[SEAL]

Attest:

RUTH C. MASON
Attesting Officer

C. MARSHALL DANN
Commissioner of Patents and Trademarks